Aug. 21, 1951 A. J. GAREY 2,564,838
MOTOR DRIVE FOR PUMP SHAFTS
Filed April 27, 1945 2 Sheets-Sheet 1

INVENTOR
Albert J. Garey
BY John Flam
ATTORNEY

Aug. 21, 1951   A. J. GAREY   2,564,838
MOTOR DRIVE FOR PUMP SHAFTS
Filed April 27, 1945   2 Sheets-Sheet 2
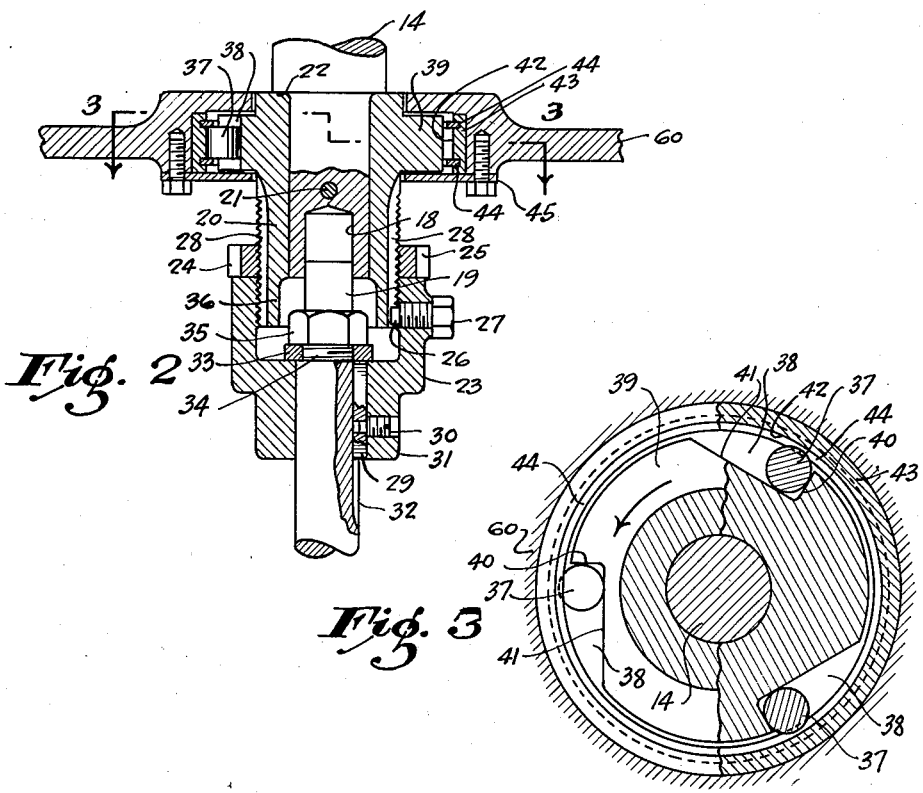
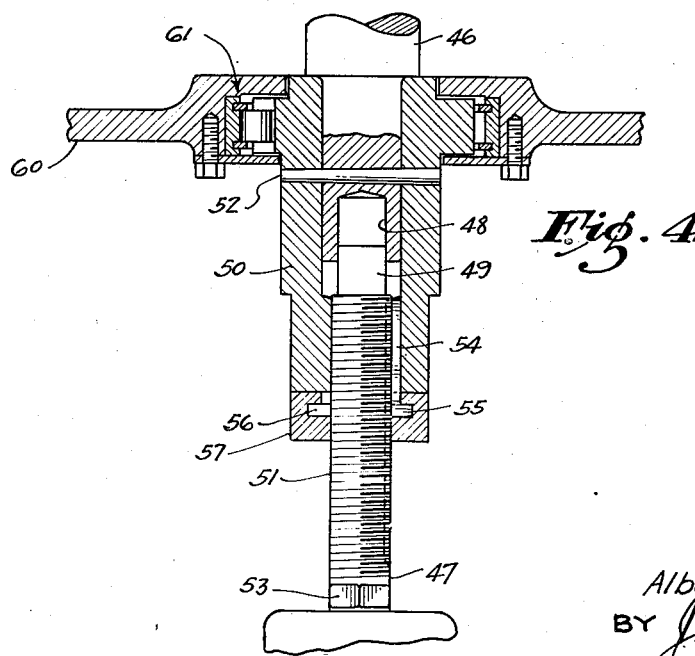
INVENTOR
Albert J. Garey
BY John Flam
ATTORNEY Patented Aug. 21, 1951

2,564,838

UNITED STATES PATENT OFFICE 2,564,838

MOTOR DRIVE FOR PUMP SHAFTS

Albert J. Garey, San Mateo, Calif., assignor to U. S. Electrical Motors, Inc., Los Angeles, Calif., a corporation of California Application April 27, 1945, Serial No. 590,710

7 Claims. (Cl. 287—62)

This invention relates to the application of power to a shaft, such as for a vertical impeller pump.

Such pumps usually include a casing extending downwardly into the well, and one or more runners mounted on a shaft. At the top of the well, an electric motor is coupled to the shaft. It is one of the general objects of this invention to provide an improved coupling between the motor and the pump shaft.

It is essential, in installations of this character, to provide axial adjustment of the pump runners with respect to the pump casing, so that the runners may be quite accurately positioned in the chambers of the casing, and so as to avoid mechanical interference between the runners and the casings, and to secure the runners in the most effective and efficient location. It is another object of this invention to provide a simple and easily operated adjustment of the pump shaft for this purpose.

It may occasionally happen that the pressure of the liquid being pumped reacts upon the impellers or runners sufficiently to produce a torque reverse to that of the driving motor. It is desirable, however, to prevent such reversal of the drive. Accordingly, it has been common in the past to utilize some form of ratchet that prevents backward rotation of the motor. In such devices, it often happens that particles of metal, rubbed off the ratchet parts, are dropped into the motor bearings.

It is another object of this invention to provide a simple and efficient non-reverse drive, which may readily be replaced or otherwise serviced, and yet which can be enclosed and located in such manner that it cannot drop any of the worn-away particles into the bearing, or any part of the motor.

It is still another object of this invention to make it possible to align the pump and motor shaft by the aid of simple structures. This is accomplished by a telescopic connection between the two shafts. The alignment may readily be made as accurate as desired, whereby the pump shaft is kept truly coaxial with the motor shaft, without requiring a radial bearing support for the upper end of the pump shaft.

By the provision of such accurate alignment, the tendency of the assembly to vibrate is minimized.

It is still another object of this invention to make it possible in a simple manner to provide a driving connection between the motor and the pump shaft, and so that this connection is independent of the aligning means. In this way, extreme nicety of fit in the driving connection is rendered unnecessary.

It is still another object of this invention to make the motor assembly independent of the pump, so that a motor may be provided for the pump that may be assembled with the pump without requiring any dismantling of the motor.

In pump installations of this character, an upthrust on the pump shaft is sometimes encountered. This may cause intermittent relief of the thrust load on the motor bearings that would thereby cause an undesired heavy shock load on the pump shaft bearings. It is another object of this invention to ensure against removal of the load from the motor bearings.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 2 is an enlarged sectional view, taken along plane 2—2 of Fig. 1;

Fig. 3 is a sectional view, taken along plane 3—3 of Fig. 2; and

Fig. 4 is a view, similar to Fig. 2, of a modified form of the invention.

Figure 1:
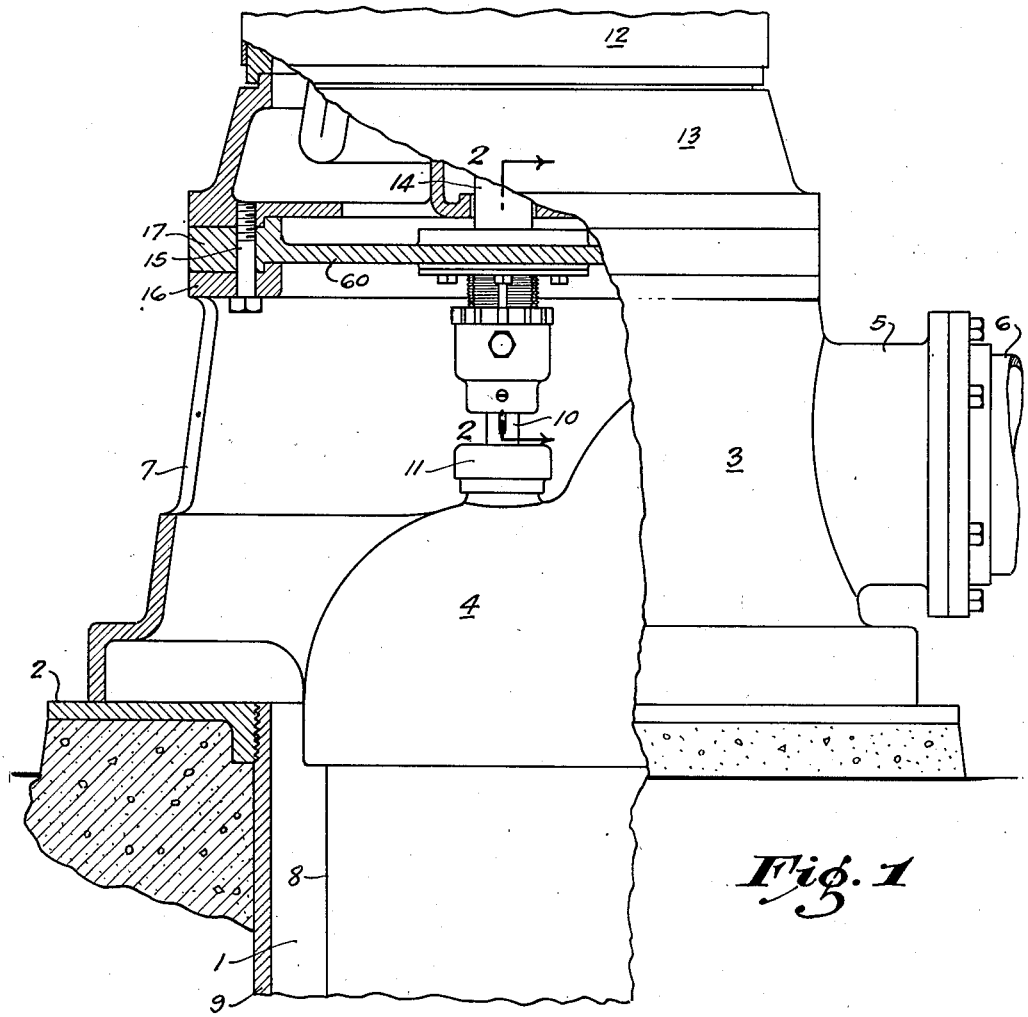
Figure 1 is a fragmentary elevation, partly in section, of a pump and the motor drive therefor, and embodying the invention.

In Fig. 1, a well 1, defined by the tubing or casing 9, is shown as provided at the top with a platform 2. Upon this platform rests a pump discharge casting 3, including a pump head 4. Extending laterally from the head 4 is an outlet 5, which may be coupled to an outlet conduit 6.

The casting 3 is conveniently formed with one or more apertures, such as 7, permitting access to the top of the pump head 4.

The pump head 4 is shown as attached to the pump casing or housing 8. Housing 8 includes several impellers or runners (not shown) which are rotated by the aid of a pump shaft 10 (see, also, Fig. 2). This pump shaft 10 extends through a packing gland 11 and carries the impellers.

Power for rotation of the shaft 10 is provided by the vertical electric motor 12. This electric motor is shown as provided with a lower bracket casting 13, and a shaft 14 that is intended to be in axial alignment with the pump shaft 10 and directly above it. The lower bracket 13 is shown as supported upon the discharge casting 3. Intermediate bracket 60 is provided between the casting 3 and the lower bracket 13 of the motor 12. The motor 12 is attached to the casting 3 as by the aid of a number of bolts 15 that extend through the upper flange 16 of the casting 3, as well as through the flange 17 that is formed at the outer periphery of the bracket 60. If desired, interfitting registers or shoulders may be provided between the flange 17 and the flange 16, as well as between the flange 17 and the lower part of bracket 13.

In this way, accurate alignment between these elements may be effected.

The connection between the motor shaft 14 and the pump shaft 10 is made adjustable so that the pump shaft 10 may be axially moved in order accurately to locate the impellers in the pump chambers formed in the casing 8. This adjustment may be effected while the axial alignment of the shafts 10 and 14 is not disturbed. For this purpose, the axial adjustment between the shafts is accomplished by means that are independent of the elements required to maintain the shafts in alignment.

Thus, for example, the motor shaft 14, as illustrated most clearly in Fig. 2, is provided at its lower end with a cylindrical coaxial recess 18. Into this recess projects a cylindrical extension 19 formed on the upper end of the shaft 10. The projection 19 has an accurate fit within the recess 18 in order to secure accurate alignment of the two shafts. The axial length of the cooperating cylindrical aligning surfaces is quite substantial. Thereby any lateral movement of either shaft at the joint is substantially prevented, even when a considerable force tending to cause misalignment is encountered.

The driving connection from the shaft 14 to the shaft 10 is accomplished by the aid of a pair of cooperating threaded members. One of these threaded members is a sleeve 20 having external threads and carried by the lower end of the shaft 14. This sleeve 20 may be arranged to be in driving relation with the shaft 14, as by a press fit or by the aid of a taper pin 21. The upper surface of the sleeve 20 abuts a shoulder 22 formed on the shaft 14.

The lower threaded portion of the sleeve 20 is in threaded engagement with the interior threads of the cooperating member 23 carried by the upper end of shaft 10. Axial adjustment of the shaft 10 is accomplished by relative rotation of the sleeve 20 and member 23. The adjustment may be maintained or locked by a locking nut 24 threaded on the sleeve 20 and provided with slots 25. These slots permit an appropriate spanner wrench to be used to operate the locking nut 24.

The drive between the members 20 and 23 is accomplished by the use of a radial drive pin 26 carried at the end of a threaded bolt 27. This pin 26 is received in any one of a number of longitudinal slots 28 provided on the exterior of the sleeve 20.

Since the alignment is effected solely by the engagement of the projection 19 and recess 18, the driving connection 26—28 may have considerable clearances without disturbing the alignment of the shafts.

In order to adjust the axial position of shaft 10, the threaded bolt 27 which extends through the member 23 may be withdrawn to free the driving pin 26 from its co-operating slot 28. Then, with lock nut 24 loosened, the member 23 can be rotated so as to move it axially with respect to the sleeve 20. The desired adjustment may be made within a fraction of a revolution, bringing the pin 26 into alignment with any one of the slots 28. The bolt 27 may then be turned inwardly so as to project the driving pin 26 into the aligned slot 28. The driving connection is thus reestablished.

All of this may readily be accomplished without dismantling the mechanism, since the adjustable parts may be reached through apertures such as 7 in the casting 3 (Fig. 1).

The driving connection between the member 23 and shaft 10 is accomplished by the aid of a key or spline 29. This key 29 is held against axial movement by a set screw 30 within the hub 31 of member 23. This key or spline operates in a slot 32 formed in the shaft 10. Below the projection 19, a threaded portion 34 is provided, of smaller diameter than the main portion of shaft 10. Disposed over the threaded portion is a washer 33 extending over the upper surface of the hub 31. A locking nut 35, threaded on the portion 34, holds the washer 33 in fixed position with respect to the shaft 10.

The projection 19 and recess 18 are sufficiently long to permit substantial axial adjustment without becoming disengaged. Furthermore, the lower end of sleeve 20 is enlarged, as indicated by the wall 36, to clear the lock nut 35 as the shaft 10 moves upwardly in the process of adjustment.

If desired, the key 29 may be merely splined within the slot 32. In this way, any lifting effect encountered by the action of the liquid upon the impellers merely causes the shaft 10 to slide upwardly along the spline 29 without raising the motor shaft 14. It is thus assured that no excess shock load would be imposed upon the pump or motor bearings. At the same time, in normal operation, vertical adjustment of member 23 causes a corresponding vertical adjustment of the shaft 10, since the weight of the shaft 10 and the parts carried thereby is sufficient to maintain the washer 33 in firm contact with the upper surface of the hub 31.

The bracket 60 extends around the upper portion of the sleeve 20 and provides a support for additional mechanism now to be described. It may sometimes happen that, in the process of pumping, a reverse torque is exerted upon the shaft 10, tending to rotate the motor shaft 14 in a reverse direction. In the present instance, a non-reverse or ratchet driving mechanism is provided, such as a wedging roller mechanism.

Thus, as shown most clearly in Figs. 2 and 3, the non-reverse drive may include a plurality of wedging rollers 37, arranged in recesses 38 formed in the flange 39 of the sleeve 20. These rollers 37, while shaft 14 rotates in a counter-clockwise direction, are engaged by the shoulders 40 of the recesses 38. However, if a torque should be exerted in a clockwise direction on shaft 14, the rollers 37 are wedged between the surfaces 41 of the recesses 38 and the inner cylindrical surface 42 formed in the race 43. This race 43 is shown as disposed in the hub of the bracket 60.

This bracket serves adequately to take the outward thrust of rollers 37 when they are urged against the race 43.

The rollers 37, as shown most clearly in Fig. 2, are restrained against axial movement by the spring rings 44 engaged in appropriate grooves in the race 43. Furthermore, the race 43 is itself held in place by the cover 45 for the hub of the bracket 60. The entire non-reverse drive assembly is located below the motor bearings, where it can be easily reached for servicing; and, in the event of wear of the parts, the dislodged particles cannot drop into the motor or motor bearings.

The motor 12 may be removed as a unit without dismantling the pump head or shaft by simply disengaging the coupling members 20 and 23. Accordingly, it is practical, with such an arrangement, to supply motors with any one of a number of standardized shafts having different sizes of recess 18 for cooperating with any size of pump shafts.

In the form of the invention illustrated in Fig. 4, the motor shaft 46 is shown as driving the pump shaft 47.

The adjustable connection between the shafts is provided by the aid of a sleeve 50 which is threaded over the threaded portion 51 of the pump shaft 47. Sleeve 50 may be fastened to the motor shaft 46 by the aid of the tapered locking pin 52. Alignment, as before, is obtained by the provision of the recess 48 in the bottom of the motor shaft 46 and the cooperating projection 49 carried by the shaft 47.

The sleeve 50 being in threaded engagement with the threaded portion 51, axial movement of the shaft 47 may be accomplished by appropriate rotation of the shaft 47, as by the aid of the non-circular portion 53 provided beneath the threaded portion 51.

The drive is accomplished by the aid of the key 54 disposed in co-operating aligned slots in the sleeve 50 and in the threaded portion 51. In order to permit relative rotation of the sleeve 50 and shaft 47 for the axial adjustment, the key 54 may be temporarily moved out of the keyway in the sleeve 50. This is accomplished, for example, by the aid of the lateral projection 55 at the lower end of the key 54. This lateral projection fits into the recess 56 formed in the lock nut 57. This lock nut 57 is threaded on the threaded member 51.

Thus, in order to make it possible to adjust the axial position of the pump shaft 47, the lock nut 57 is rotated sufficiently to withdraw the key 54 from the sleeve 50. Then, the shaft 47 may be rotated with respect to the sleeve 50 for performing the axial adjustment. This adjusment is accomplished in increments of one revolution, since the key 54 must be brought in alignment with the keyway in the sleeve 50 before the lock nut 57 may be threaded back into the locked position illustrated in Fig. 4.

In this form also, a non-reverse drive 61 may be formed in the hub of bracket 60. This drive is similar to that described in connection with Figs. 2 and 3.

The inventor claims:

1. In an adjustable coupling between a vertical motor shaft and a vertical pump shaft, an axial extension on one of said shafts, there being a recess in the adjacent end of the other shaft in which said extension is piloted, and means forming a driving connection between said shafts comprising interengaging threaded elements for enabling axial adjustment of said shafts with respect to each other.

2. In an adjustable coupling between a vertical motor shaft and a coaxial vertical pump shaft extending below the motor shaft: means providing mating aligning parts on the adjacent ends of said shafts; and a driving connection between the shafts, comprising a pair of cooperating threaded members carried respectively by the motor shaft and the pump shaft for making it possible to adjust the pump shaft axially, the inner threaded member having a slot, and a driving pin carried by the outer member and extending into the slot.

3. In an adjustable coupling between a vertical motor shaft and a coaxial vertical pump shaft extending below the motor shaft: means forming an axially extending recess in one of said shafts; means forming an axial extension on the other of said shafts, said extension being received in aligning relation in said recess; a pair of cooperating threaded members carried respectively by the motor shaft and the pump shaft, both of said members having diameters greater than the shafts; means supplementing the threaded engagement of the members for forming a driving connection between the members, the pump shaft extending through its cooperating member; means carried by the pump shaft and limiting downward movement of the pump shaft with respect to the cooperating member; and means forming a spline connection between the pump shaft and its cooperating threaded member.

4. In an adjustable coupling between a vertical motor shaft and a coaxial vertical pump shaft extending below the motor shaft: means forming an axially extending recess in one of said shafts; means forming an axial extension on the other of said shafts, said extension being received in aligning relation in said recess; a sleeve carried by the lower end of the motor shaft and externally threaded; an internally threaded member associated with the pump shaft and in threaded relation to the sleeve; a lock nut on the sleeve and in threaded relation to the sleeve; said sleeve having a series of longitudinal slots intersecting the threads on the sleeve; and a removable driving pin carried by the internally threaded member and cooperating with one of the slots.

5. In an adjustable coupling between a vertical motor shaft and a coaxial vertical pump shaft extending below the motor shaft: means forming an axially extending recess in one of said shafts; means forming an axial extension on the other of said shafts, said extension being received in aligning relation in said recess; a sleeve carried by the lower end of the motor shaft and projecting downwardly below the motor shaft, said sleeve being internally threaded, said pump shaft having a threaded extension in engagement with said sleeve; a lock nut on the extension; and a key anchored in the nut and forming a driving connection between the threaded extension and the sleeve.

6. In an adjustable coupling between a vertical motor shaft and a coaxial vertical pump shaft extending below the motor shaft: means providing mating aligning parts on the adjacent ends of said shafts; a pair of cooperating threaded members carried respectively by the motor shaft and the pump shaft for making it possible to adjust said shafts axially with respect to each other; and means forming a removable driving connection between said cooperating members.

7. In an adjustable coupling between a vertical motor shaft and a coaxial vertical pump shaft extending below the motor shaft: means providing mating aligning parts on the adjacent ends of said shafts; a pair of cooperating threaded members carried respectively by the motor shaft and the pump shaft for making it possible to adjust said shafts axially with respect to each other; said pump shaft being splined to one of said cooperating members to permit relative axial movement therebetween; shoulder forming means carried by said pump shaft engageable with said one of said cooperating members limiting the downward movement of said pump shaft with respect to its cooperating member; and means forming a removable driving connection between said cooperating members.

A. J. GAREY.

REFERENCES CITED

The following references are of record in the file of this patent:

UNITED STATES PATENTS

| Number | Name | Date |
|---|---|---|
| 793,690 | Snyder | July 4, 1905 |
| 797,638 | Thomas | Aug. 22, 1905 |
| 910,797 | Donnelly et al. | Jan. 26, 1909 |
| 1,383,040 | Van Atten | June 28, 1921 |
| 1,400,079 | Kolling | Dec. 13, 1921 |
| 1,588,128 | Montgomery | June 8, 1926 |
| 1,663,226 | Wintroath | Mar. 20, 1928 |
| 1,774,050 | Brown | Aug. 26, 1930 |
| 1,778,341 | Schlegel et al. | Oct. 14, 1930 |
| 2,043,598 | Subia | June 9, 1936 |
| 2,181,973 | Jasber | Dec. 5, 1939 |
| 2,182,411 | Rosenberg et al. | Dec. 5, 1939 |
| 2,210,811 | Kelpsch | Aug. 6, 1940 |
| 2,258,377 | Collins | Oct. 7, 1941 |
| 2,283,195 | Farrell et al. | May 19, 1942 |
| 2,332,061 | Conkle | Oct. 19, 1943 |